(12) United States Patent
Hoshino

(10) Patent No.: US 12,528,337 B2
(45) Date of Patent: Jan. 20, 2026

(54) AIR CONDITIONING SYSTEM FOR A VEHICLE

(71) Applicant: TOYOTA JIDOSHA KABUSHIKI KAISHA, Aichi-ken (JP)

(72) Inventor: Yu Hoshino, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 302 days.

(21) Appl. No.: 18/465,161

(22) Filed: Sep. 12, 2023

(65) Prior Publication Data
US 2024/0100910 A1 Mar. 28, 2024

(30) Foreign Application Priority Data
Sep. 28, 2022 (JP) ................ 2022-154320

(51) Int. Cl.
*B60H 1/00* (2006.01)
*B60H 1/22* (2006.01)
*B60H 1/24* (2006.01)
*B60H 1/32* (2006.01)

(52) U.S. Cl.
CPC ..... *B60H 1/00978* (2013.01); *B60H 1/00392* (2013.01); *B60H 1/00764* (2013.01); *B60H 1/2221* (2013.01); *B60H 1/242* (2013.01); *B60H 1/244* (2013.01); *B60H 1/3223* (2013.01); *B60H 2001/3298* (2013.01)

(58) Field of Classification Search
CPC ............ B60H 1/00978; B60H 1/00392; B60H 1/00764; B60H 1/2221; B60H 1/242; B60H 1/244; B60H 1/3223; B60H 2001/3298
See application file for complete search history.

(56) References Cited

U.S. PATENT DOCUMENTS

| | | | | |
|---|---|---|---|---|
| 4,681,153 A | * | 7/1987 | Uchida | G05D 23/1917 165/204 |
| 4,730,662 A | * | 3/1988 | Kobayashi | B60S 1/54 165/204 |
| 4,819,715 A | * | 4/1989 | Kobayashi | G05D 23/20 165/203 |

(Continued)

FOREIGN PATENT DOCUMENTS

| | | | | |
|---|---|---|---|---|
| DE | 10336268 B4 | * | 7/2018 | ........... B60H 1/3226 |
| DE | 112016005037 T5 | * | 8/2018 | ........... B60K 11/085 |

(Continued)

*Primary Examiner* — Ljiljana V. Ciric
(74) *Attorney, Agent, or Firm* — HAUPTMAN HAM, LLP

(57) ABSTRACT

An air conditioning system for a vehicle includes a grille shutter on a front part of a vehicle and arranged in a front face of an engine compartment where a driving source is installed, the grille shutter being capable of adjusting a volume of outside air to be introduced into the engine compartment. A heat source is in the engine compartment. Circulation piping includes a temperature increase section which goes through the heat source. The circulation piping diverges into a vehicle cabin front section and a vehicle cabin rear section from the temperature increase section. A rear air-conditioning controller can limit the volume of air to a rear side of a vehicle cabin when a first condition is satisfied. The first condition is a condition where a grille shutter is stuck in an open state and a defroster function of the vehicle is in an ON state.

3 Claims, 9 Drawing Sheets

(56) References Cited

U.S. PATENT DOCUMENTS

| | | | | |
|---|---|---|---|---|
| 4,974,664 A * | 12/1990 | Glennon | ............ | B60H 1/00885 |
| | | | | 165/300 |
| 5,085,267 A * | 2/1992 | Torrence | ............ | B60H 1/00885 |
| | | | | 318/641 |
| 5,199,485 A * | 4/1993 | Ito | ...................... | B60H 1/00007 |
| | | | | 454/126 |
| 5,586,448 A * | 12/1996 | Ikeda | ................. | B60H 1/00914 |
| | | | | 62/236 |
| 6,640,570 B2 * | 11/2003 | Nishida | .............. | B60H 1/00064 |
| | | | | 237/12.3 A |
| 6,655,163 B1 * | 12/2003 | Scherer | .................... | B60H 1/24 |
| | | | | 165/203 |
| 7,121,368 B2 * | 10/2006 | MacKelvie | ............ | B60K 11/00 |
| | | | | 123/41.12 |
| 9,683,774 B2 * | 6/2017 | Kanemaru | ............. | B60H 1/005 |
| 10,371,419 B2 * | 8/2019 | Enomoto | ................ | F28F 27/02 |
| 10,457,117 B2 * | 10/2019 | Enomoto | ........... | B60H 1/00899 |
| 10,987,991 B2 * | 4/2021 | Tsumagari | ......... | B60H 1/00064 |
| 11,127,993 B2 * | 9/2021 | King | ................ | B60H 1/00499 |
| 11,629,633 B2 * | 4/2023 | Marumoto | ............... | B60H 1/3208 |
| | | | | 123/542 |
| 11,865,898 B2 * | 1/2024 | Nakahara | ........... | B60H 1/00764 |
| 11,867,424 B1 * | 1/2024 | Wujek | ................ | B60H 1/005 |
| 11,936,021 B2 * | 3/2024 | King | ................ | B60H 1/00921 |
| 2006/0186224 A1 * | 8/2006 | Yoshii | ............... | B60H 1/00378 |
| | | | | 239/548 |
| 2010/0000713 A1 * | 1/2010 | Takahashi | .......... | B60H 1/00899 |
| | | | | 165/61 |
| 2012/0090814 A1 * | 4/2012 | Crosier | .............. | B60H 1/00207 |
| | | | | 165/59 |
| 2012/0247747 A1 * | 10/2012 | DiGasbarro | ....... | B60H 1/00028 |
| | | | | 165/122 |
| 2012/0252340 A1 * | 10/2012 | Gannon | ............. | B60H 1/00028 |
| | | | | 454/75 |
| 2012/0297805 A1 * | 11/2012 | Kamada | ............. | B60H 1/32281 |
| | | | | 62/208 |
| 2013/0175022 A1 * | 7/2013 | King | ....................... | B60L 50/62 |
| | | | | 237/12.3 B |
| 2016/0257179 A1 * | 9/2016 | Miyakoshi | ......... | B60H 1/00921 |
| 2018/0009288 A1 * | 1/2018 | Bhasin | ..................... | F24F 11/30 |
| 2018/0334014 A1 * | 11/2018 | Nakasako | ................. | B60L 1/04 |
| 2019/0184789 A1 * | 6/2019 | Aizawa | ............. | B60H 1/00742 |
| 2021/0252945 A1 | 8/2021 | Yamaga et al. | | |
| 2024/0100910 A1 * | 3/2024 | Hoshino | ............ | B60H 1/00764 |
| 2024/0391294 A1 * | 11/2024 | Brown | ............... | B60H 1/00671 |

FOREIGN PATENT DOCUMENTS

| | | | | |
|---|---|---|---|---|
| DE | 102018207913 A1 * | 11/2018 | ......... | B60H 1/00785 |
| EP | 1132232 A1 * | 9/2001 | ............. | B60H 1/242 |
| EP | 1132232 B1 * | 9/2008 | ............. | B60H 1/242 |
| JP | H05319077 A * | 12/1993 | ............. | F25B 13/00 |
| JP | H0640240 A * | 2/1994 | ......... | B60H 1/00007 |
| JP | 3538845 B2 * | 6/2004 | ......... | B60H 1/00914 |
| JP | 2012051386 A * | 3/2012 | ............. | B60H 1/143 |
| JP | 2021-131051 A | 9/2021 | | |

* cited by examiner

AIR CONDITIONING SYSTEM FOR A VEHICLE

CROSS REFERENCE TO RELATED APPLICATION

This application claims priority to Japanese Patent Application No. 2022-154320, filed on Sep. 28, 2022, which is incorporated herein by reference in its entirety including the specification, claims, drawings, and abstract.

TECHNICAL FIELD

The present specification discloses an air conditioning system for a vehicle.

BACKGROUND

An air conditioning system is mounted in a vehicle. For example, in an electric vehicle (BEV) equipped with a rotary electric machine as its driving source instead of an internal combustion engine, an electric heater such as a Positive Temperature Coefficient (PTC) heater is mounted as its heater because such a vehicle cannot acquire heat from the internal combustion engine.

For example, the electric heater includes a heat source (such as a PTC element) that generates heat by supply of electric power. Refrigerant liquid is increased in temperature after flowing through this electric heater. The refrigerant liquid that has been increased in temperature passes through piping to flow in front of a front side blower and a rear side blower. Air sent from the blower becomes warm air by exchanging heat with the refrigerant liquid passing through the piping. This warm air is supplied to a front side space and a rear side space of a vehicle cabin.

Meanwhile, a heat exchange-type air conditioning system conventionally mounted in a vehicle includes a heat exchanger. This heat exchanger is mounted in an engine compartment. A front grille is provided in a front face of the engine compartment, that is, in a front face of the vehicle. Outside air introduced into the engine compartment through the front grille exchanges heat with the heat exchanger.

Here, when the layout of the heat exchange-type air conditioning system is applied to an electric heater system, for example, an electric heater is mounted in a motor compartment of an electric vehicle instead of the heat exchanger. Note that since both the engine compartment and the motor compartment are chambers where a driving source is installed, these compartments will hereinafter be collectively referred to as an engine compartment.

For the purpose of a fast temperature increase (warm-up) of devices inside an engine compartment, for example, in JP 2021-131051 A, a grille shutter is provided behind a front grille. The volume of air outside a vehicle to be introduced into the engine compartment through the front grille is adjustable by adjusting the opening of the grille shutter.

Meanwhile, fins of the grille shutter sometimes get stuck open. The state of being stuck open indicates a state where the fins in an open state get stuck in an open state and cannot be closed even after receiving a close command. For example, the fins can get stuck open due to reasons such as foreign matter (e.g., a snowball) interposed between the adjacent fins in an open state and a failure of an actuator that turns the fins.

Outside air enters the engine compartment due to the fins being stuck open. This may draw the temperature of a heat source in the electric heater and suppress its temperature increase function. Refrigerant liquid needs to be sufficiently increased in temperature by the electric heater, particularly when a defroster function, which is a defogging function for a windshield glass, is executed.

To deal with this, the present specification discloses an air conditioning system for a vehicle that is capable of, in a case where the heat source of the air conditioning system is mounted in the engine compartment, performing defogging by the defroster reliably when the fins of the grille shutter are stuck open.

SUMMARY

An air conditioning system for a vehicle disclosed in the present specification includes: a grille shutter; a heat source; circulation piping; a front blower; a rear blower; a front air-conditioning controller; and a rear air-conditioning controller. The grille shutter is provided on a front side of a vehicle and arranged in a front face of an engine compartment where a driving source is installed, and is capable of adjusting the volume of outside air to be introduced into the engine compartment. The heat source is installed in the engine compartment. The circulation piping is piping through which refrigerant liquid flows and includes a temperature increase section which goes through the heat source. In addition, the circulation piping diverges into a vehicle cabin front section and a vehicle cabin rear section from the temperature increase section and then converges to return to the temperature increase section. The front blower is configured to send warm air to a front part of a vehicle cabin by exchanging heat with refrigerant liquid flowing through the vehicle cabin front section. The rear blower is configured to send warm air to a rear part of the vehicle cabin by exchanging heat with refrigerant liquid flowing through the vehicle cabin rear section. The front air-conditioning controller is configured to control the volume of air directed to the front part of the vehicle cabin, including turning a defroster function on/off. The rear air-conditioning controller is configured to control the volume of air directed to the rear part of the vehicle cabin. Further, the rear air-conditioning controller is allowed to limit the volume of air directed to the rear part of the vehicle cabin when a first condition is satisfied. The first condition is a condition that the grille shutter is stuck in an open state and the defroster function is in an on state.

According to the above configuration, the volume of warm air directed to the rear part of the vehicle cabin is limited when the grille shutter is stuck open, thus reducing heat exchange (i.e., temperature decrease) of refrigerant liquid. As a result, warm air that has been sufficiently increased in temperature can be used for the defroster.

In addition, in the above configuration, the rear air-conditioning controller may be allowed to limit the volume of air directed to the rear part of the vehicle cabin when the first condition and a second condition are satisfied. The second condition is a condition that a temperature outside the vehicle is equal to or lower than a threshold temperature.

According to the above configuration, the limitation on the volume of air to the rear part of the vehicle cabin can be avoided when the temperature outside the vehicle exceeds the threshold temperature, thus suppressing deterioration in comfort of rear seats.

Further, in the above configuration, the rear air-conditioning controller may limit the volume of air directed to the rear part of the vehicle cabin when the first condition and the second condition are satisfied and a third condition is satisfied. The third condition is a condition that a vehicle speed is equal to or higher than a threshold speed.

According to the above configuration, the limitation on the volume of air to the rear side of the vehicle cabin can be avoided when the vehicle speed is lower than the threshold speed, thus suppressing deterioration in comfort of the rear seats.

According to the air conditioning system for a vehicle of the present specification, in a case where the heat source of the air conditioning system is mounted in the engine compartment, defogging by the defroster can be performed reliably when the fins of the grille shutter are stuck open.

BRIEF DESCRIPTION OF DRAWINGS

An embodiment of the present disclosure will be described based on the following figures, wherein.

DESCRIPTION OF EMBODIMENTS

Hereinbelow, an air conditioning system for a vehicle according to an embodiment will be described using the drawings. Shapes, materials, the number of constituents, and numeric values in the following description are illustrated for the sake of description and can be changed as appropriate according to the specifications of the air conditioning system for a vehicle. In addition, hereinbelow, equivalent constituents are assigned the same reference signs throughout the drawings.

Further, in FIGS. 1 to 4, an orthogonal coordinate system constituted of an FR axis, an RW axis, and an UP axis is used for indicating the position and direction of each configuration. The FR axis is an axis in a longitudinal direction of the vehicle with a front side with respect to the vehicle defined as a positive direction. The RW axis is an axis in a vehicle width direction with a right side with respect to the vehicle defined as a positive direction. The UP axis is an axis in a vertical direction of the vehicle with an upper side defined as a positive direction.

<Entire Configuration>

Figure 5:
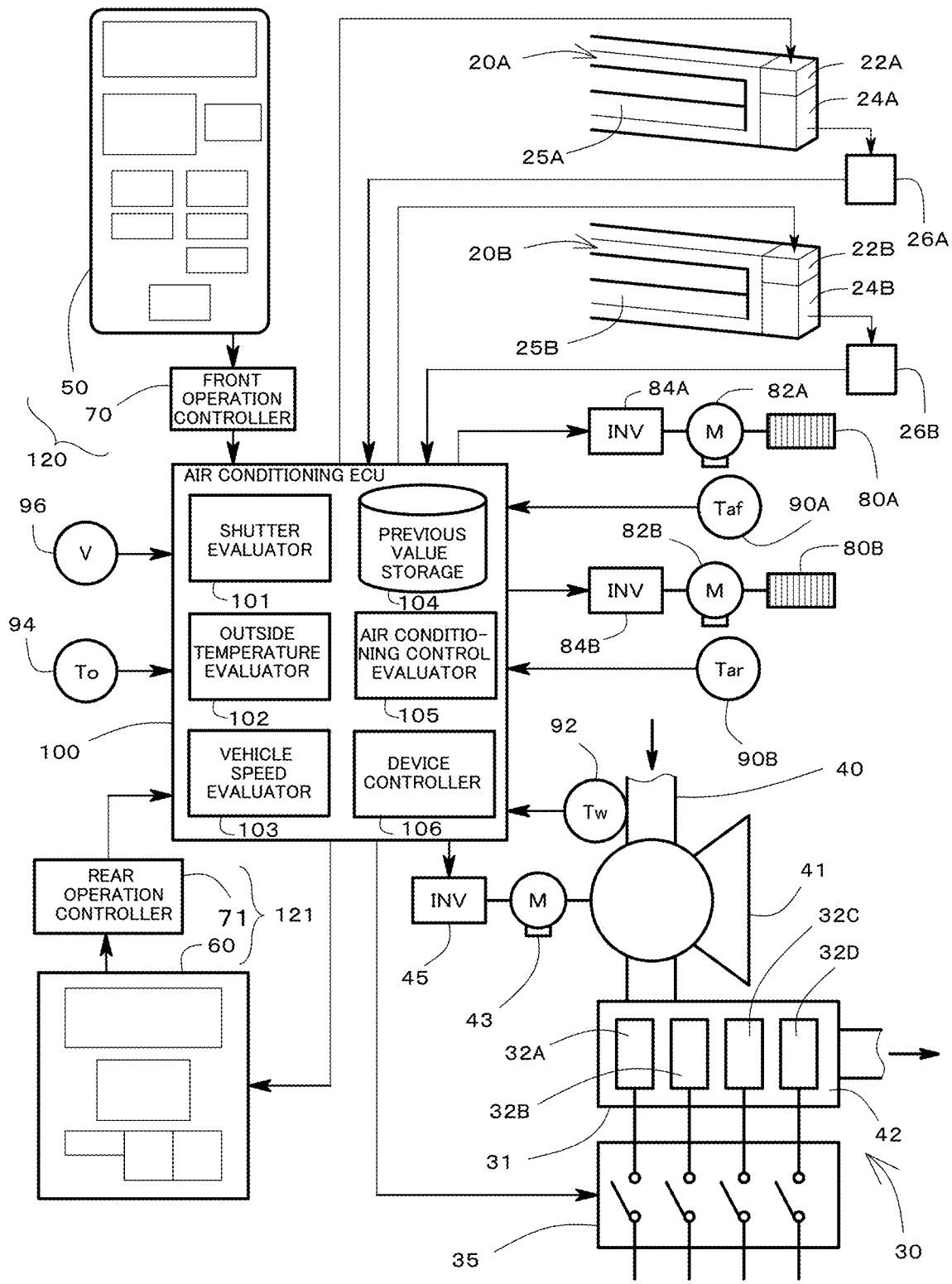
FIG. 5 is a diagram illustrating the entire configuration of an air conditioning system for a vehicle according to this embodiment.

FIG. 5 illustrates the overall configuration of the air conditioning system for a vehicle according to this embodiment. Specifically, this air conditioning system includes, as a mechanism for supplying warm air: an electric heater 30; circulation piping 40; a front blower 80A; and a rear blower 80B. In addition, the air conditioning system includes, as a mechanism for controlling the volume of warm air and a location to which warm air is to be discharged: a front air-conditioning operation panel 50; a rear air-conditioning operation panel 60; a front operation controller 70; a rear operation controller 71; and an air conditioning ECU 100. Further, the air conditioning system includes, as a mechanism for adjusting the flow volume of air outside the vehicle (hereinafter referred to as the volume of air outside the vehicle, as appropriate) to be drawn into an engine compartment 12 (see FIG. 1) where the electric heater 30 is installed: a grille shutter upper 20A; and a grille shutter lower 20B.

When a defroster button 58A (see FIG. 3) of the front air-conditioning operation panel 50 is turned on, the air conditioning ECU 100 judges whether or not at least one of the grille shutter upper 20A and the grille shutter lower 20B is stuck open.

When a defroster function is in an on state and at least one of the grille shutter upper 20A and the grille shutter lower 20B is stuck open (when a first condition is satisfied), the rear operation controller 71 can execute limitation on the volume of air to a rear side of a vehicle cabin.

<Engine Compartment>

Figure 1:
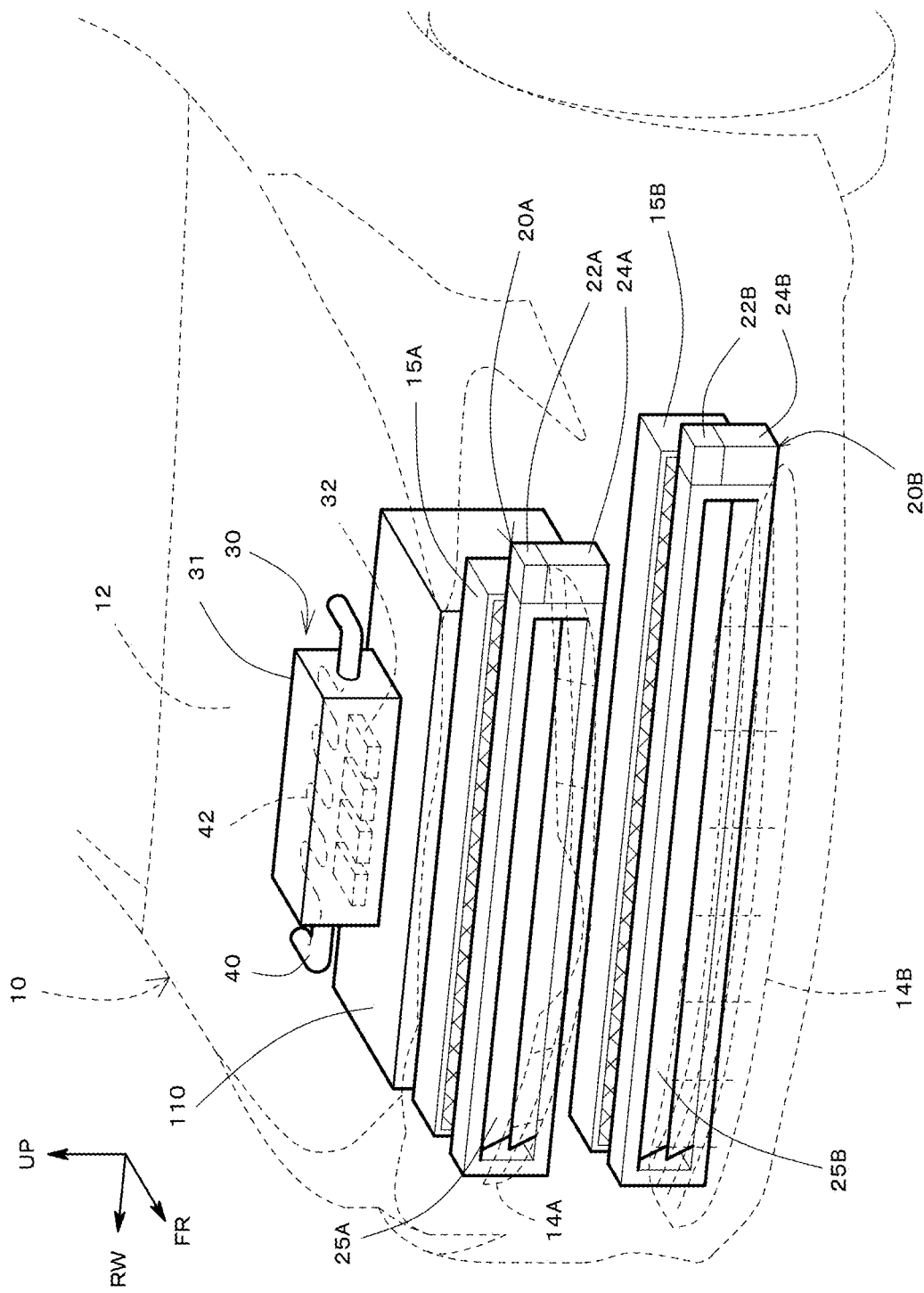
FIG. 1 is a diagram illustrating the configuration of an engine compartment in a vehicle.

FIG. 1 illustrates devices installed in the engine compartment 12 of a vehicle 10. The vehicle 10 is an electric vehicle (BEV) using a rotary electric machine 110 as its driving source, for example. The vehicle 10 includes the engine compartment 12 as a chamber where this rotary electric machine 110 is installed. The engine compartment 12 is also referred to as a motor compartment. In addition, the engine compartment 12 is provided in a front part of the vehicle 10. For example, referring to FIG. 2, the engine compartment 12 is provided ahead of a vehicle cabin 16.

Referring to FIG. 1, a front grille is provided in a front face of the engine compartment 12. As described above, since the engine compartment 12 is provided in the front part of the vehicle 10, the front grille that is provided in the front face of the engine compartment 12 is disposed in a front face of the vehicle 10.

For example, in the example of FIG. 1, the front grille is divided into upper and lower parts. Specifically, a front grille upper 14A which is an upper grille and a front grille lower 14B which is a lower grille are provided in the front face of the engine compartment 12. The front grille upper 14A and the front grille lower 14B extend in the vehicle width direction in the front face of the vehicle.

A radiator upper 15A and a radiator lower 15B are provided behind the front grille upper 14A and the front grille lower 14B. The radiator upper 15A and the radiator lower 15B are provided in the engine compartment 12 to cool electric devices of the vehicle 10. For example, refrigerant that cools the rotary electric machine 110 flows into the radiator upper 15A and exchanges heat with the air outside the vehicle. In addition, refrigerant that cools high power consumption electric devices such as an inverter and a DC/DC converter flows into the radiator lower 15B and exchanges heat with the air outside the vehicle.

In the front face of the engine compartment 12, the grille shutter upper 20A and the grille shutter lower 20B are provided between the pair of the front grille upper 14A and the front grille lower 14B and the pair of the radiator upper 15A and the radiator lower 15B. The grille shutter upper 20A and the grille shutter lower 20B include: controllers 22A and 22B; actuators 24A and 24B; and fins 25A and 25B.

The fins 25A and 25B extend across the entire width (the entire length in the RW direction) of grill openings of the front grille upper 14A and the front grille lower 14B, for example. The controllers 22A and 22B are configured to drive the actuators 24A and 24B in response to a drive command from the air conditioning ECU 100 (see FIG. 5). The drive command includes an open command and a close command, for example. The actuators 24A and 24B open and close the fins 25A and 25B based on the drive control of the controllers 22A and 22B. The opening and closing of the fins 25A and 25B can adjust the volume of air outside the vehicle to be introduced into the engine compartment 12.

<Air Conditioning System>

Figure 2:
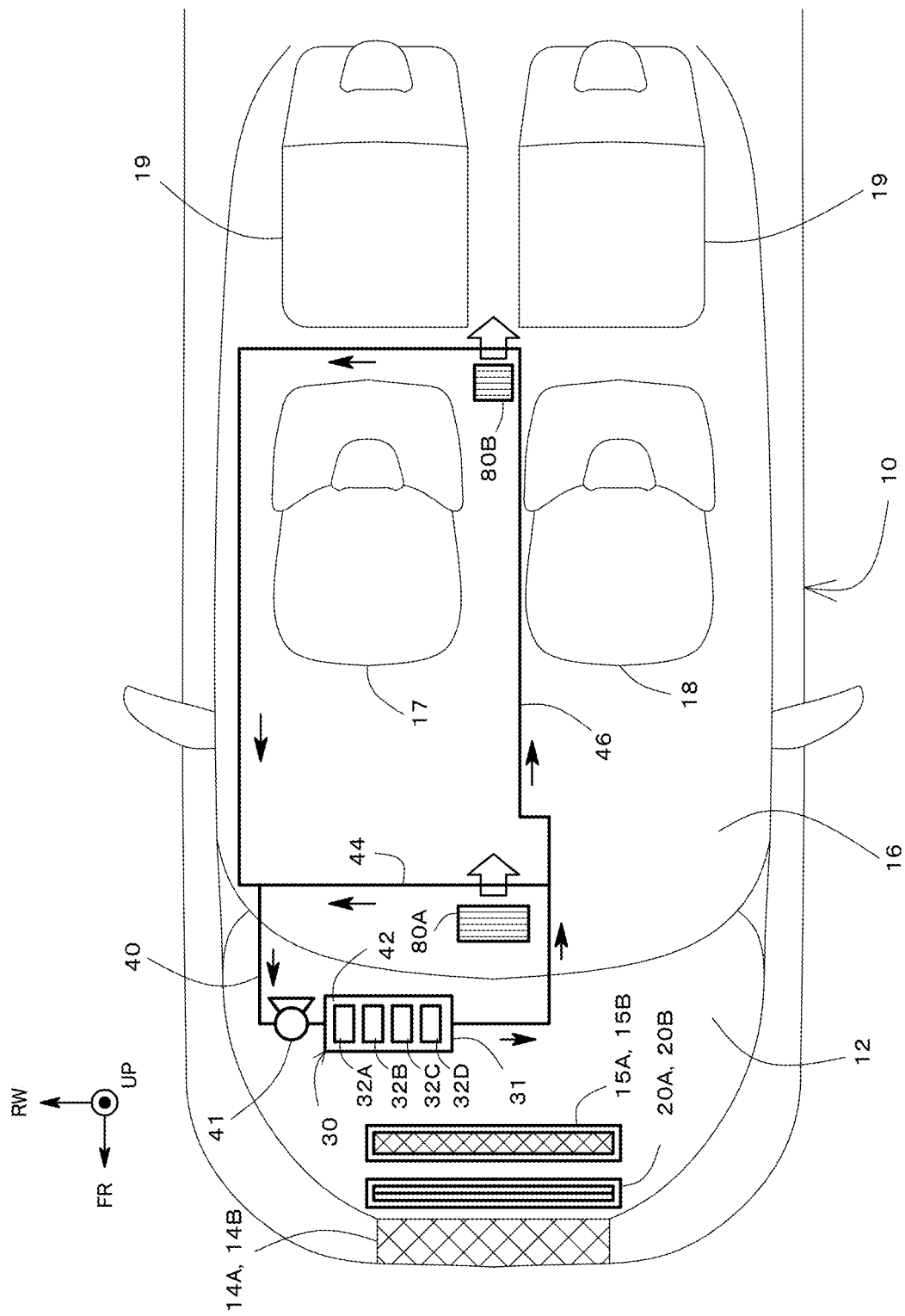
FIG. 2 is a diagram illustrating an air conditioning system, particularly circulation piping.

Referring to FIGS. 1 and 2, the vehicle 10 includes an air conditioning system for the vehicle cabin 16. As a heater function of this air conditioning system, the vehicle 10 is provided with: the electric heater 30; the circulation piping 40; a pump 41; the front blower 80A; and the rear blower 80B. Note that, for the purpose of simplifying the drawing, air guiding means such as a duct and an inner-duct door is not illustrated in FIG. 2.

The electric heater 30 includes PTC elements 32A to 32D, being a heat source. The PTC elements 32A to 32D are heat generators that generate heat by supply of electric power, and their resistance values are known to be variable depending on temperature.

For example, when the PTC elements 32A to 32D are supplied with electric power, their temperature increases, and their electric resistance values increase rapidly once the temperature exceeds a predetermined threshold temperature. This reduces an electric current to be supplied to the PTC elements 32A to 32D under the same voltage and suppresses an increase in temperature. By using the PTC elements 32A to 32D with the threshold temperature set as their target temperature, the electric current is reduced after the temperature reaches the target temperature, and a further increase in temperature is suppressed.

The electric heater 30 includes the multiple PTC elements 32A to 32D as a heat source, for example. Further, the electric heater 30 is provided with a switch panel 35 (see FIG. 5) that is configured to switch the mode between supply and shutoff of an electric current. As will be described later, in response to a request for a temperature increase of refrigerant liquid, the air conditioning ECU 100 selects the PTC elements 32A to 32D to which an electric current is to be supplied.

The electric heater 30 includes a casing 31 that houses the PTC elements 32A to 32D. The casing 31 is made of a metallic material such as aluminum, for example. In the casing 31, a temperature increase section 42 that goes through the heat source is provided as a part of the circulation piping 40. For example, piping that is in contact with the PTC elements 32A to 32D, being the heat source, is provided in the casing 31, and the temperature increase section 42 is a section in which this piping extends.

In addition, the electric heater 30 is installed in the engine compartment 12. Thus, the air outside the vehicle that is introduced through the front grille upper 14A and the front grille lower 14B may draw heat from the electric heater 30 and the PTC elements 32A to 32D, being the heat source, and this may slow down the pace of a temperature increase of refrigerant liquid. In particular, when at least one of the grille shutter upper 20A and the grille shutter lower 20B is stuck open, the volume of air outside the vehicle is hard to adjust, and accordingly the electric heater 30 may be exposed to a large volume of air outside the vehicle.

To deal with this, as will be described later, when at least one of the grille shutter upper 20A and the grille shutter lower 20B is stuck open and the defroster function is in an on state for the air conditioning system, limitation on the volume of air to the rear side of the vehicle cabin 16 can be executed. This limitation on the volume of air reduces heat exchange (i.e., temperature decrease) of refrigerant liquid. Thus, warm air sufficiently increased in temperature can be used for the defroster.

The circulation piping 40 which is a flow path of refrigerant liquid includes: the temperature increase section 42; a vehicle cabin front section 44; and a vehicle cabin rear section 46. The temperature increase section 42 is provided in the electric heater 30, as described above. Refrigerant liquid that has increased in temperature after passing through the temperature increase section 42 diverges into the vehicle cabin front section 44 and the vehicle cabin rear section 46. The vehicle cabin front section 44 passes in front of an air vent of the front blower 80A, and the vehicle cabin rear section 46 passes in front of an air vent of the rear blower 80B. Then, the vehicle cabin front section 44 and the vehicle cabin rear section 46 converge downstream to return to the temperature increase section 42.

The flow volume of refrigerant liquid flowing through the circulation piping 40 is controlled by the pump 41. Referring to FIG. 5, the pump 41 is connected to a pump motor 43. The pump motor 43 is controlled to rotate by a pump inverter 45.

For example, a PWM signal is output from a device controller 106 of the air conditioning ECU 100. A switching element of the pump inverter 45 is driven in response to this PWM signal. Then, a voltage according to the duty cycle of the PWM signal is applied to the pump motor 43, and drive power according to the applied voltage is input to the pump 41.

Referring to FIG. 2, the front blower 80A is housed in an instrument panel 115 (see FIG. 3) located in a front part of the vehicle cabin 16, for example. In addition, the vehicle cabin front section 44 of the circulation piping 40 is also housed in the instrument panel 115.

Air sent from the front blower 80A becomes warm air by exchanging heat with refrigerant liquid when passing through the vehicle cabin front section 44. This warm air blows to the front part of the vehicle cabin through a discharge port such as a register (not illustrated) provided in the instrument panel 115.

In addition, a blowout port 13 through which air from the front blower 80A is sent toward a windshield glass 11 (see FIG. 3) is provided in a front end portion of the instrument panel 115. For example, when the defroster button 58A of the front air-conditioning operation panel 50 is turned on, a duct door (not illustrated) inside the instrument panel 115 is opened and closed so that warm air blows through the blowout port 13.

The rear blower 80B is provided in the vehicle cabin rear section 46 of the circulation piping 40 and in a lower part of a front console box 117 (see FIG. 3), for example. Air sent from the rear blower 80B becomes warm air by exchanging heat with refrigerant liquid when passing through the vehicle cabin rear section 46. This warm air blows to a rear part of the vehicle cabin through a discharge port (not illustrated) provided in a back face of the front console box 117.

As illustrated in FIG. 5, the front blower 80A is connected to a front motor 82A. The front motor 82A is controlled to rotate by a front inverter 84A. Likewise, the rear blower 80B is connected to a rear motor 82B. The rear motor 82B is controlled to rotate by a rear inverter 84B.

For example, a PWM signal is output from the device controller 106 of the air conditioning ECU 100. Switching elements of the front inverter 84A and the rear inverter 84B are driven in response to this PWM signal. Then, a voltage according to the duty cycle of the PWM signal is applied to the front motor 82A and the rear motor 82B, and drive power according to the applied voltage is input to the front blower 80A and the rear blower 80B.

<Air Conditioning Operator>

Figure 3:
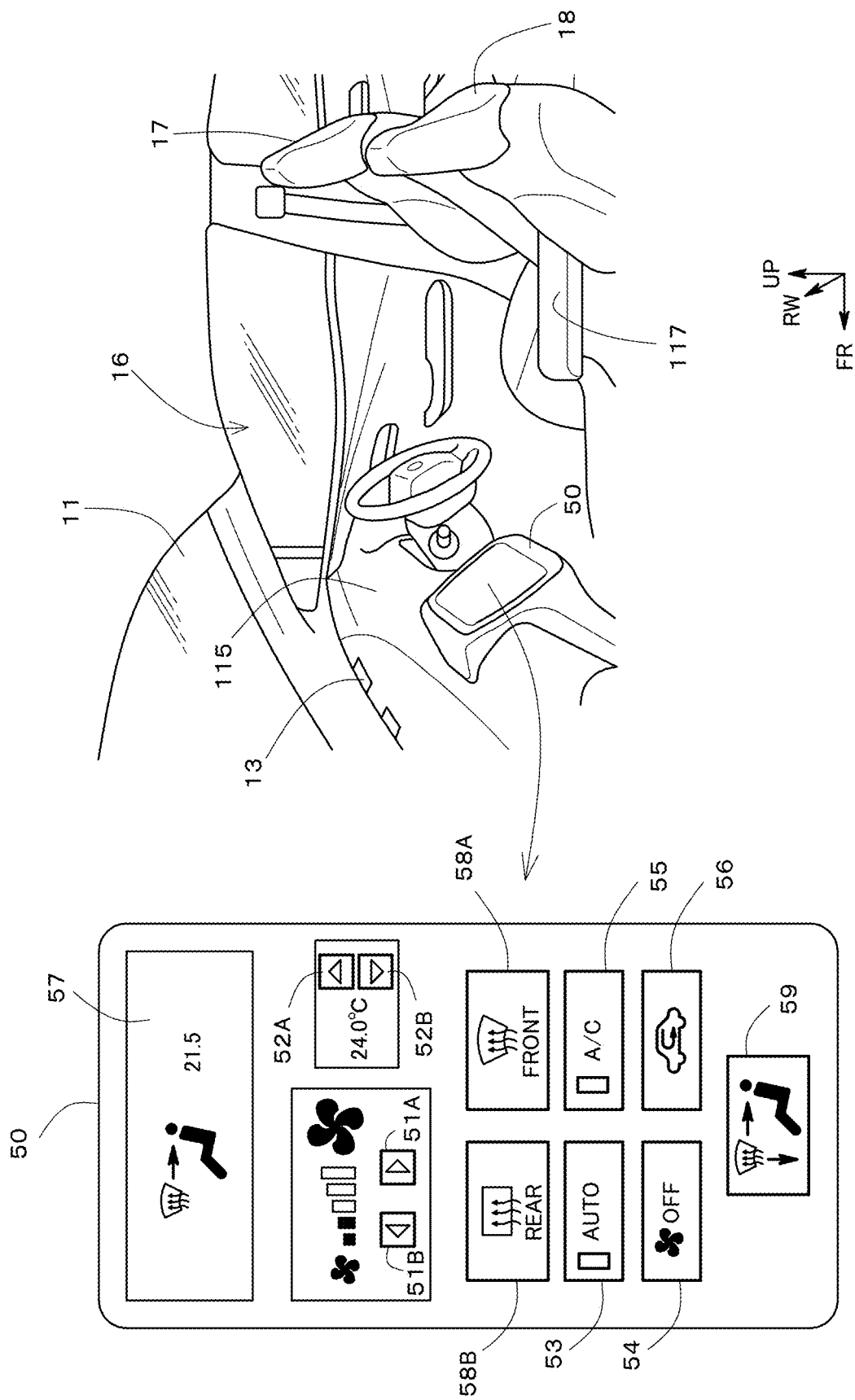
FIG. 3 is a diagram illustrating the configuration of a front portion of a vehicle cabin.

FIG. 3 illustrates the front air-conditioning operation panel 50 which is a part of the air conditioning system for a vehicle according to this embodiment. For example, the front air-conditioning operation panel 50 is provided in the instrument panel 115. This front air-conditioning operation panel 50 and the front operation controller 70 (see FIG. 5) constitute a front air-conditioning controller 120.

The front air-conditioning operation panel 50 may be a touch panel that functions as both an inputter and a display, for example. Operation on the volume of air to the front part of the vehicle cabin, including on/off of the defroster function, is possible through the front air-conditioning operation panel 50.

For example, the front air-conditioning operation panel 50 is provided with: air-volume setting buttons 51A and 51B; temperature setting buttons 52A and 52B; an automatic button 53; and a blower button 54. The front air-conditioning operation panel 50 is further provided with: an air conditioning button 55; an internal/external air switching button 56; a display 57; the defroster button 58A; a rear defogger button 58B; and a blowout port selection switch 59. Since the functions of these buttons and switches are already known, their description will be omitted, as appropriate.

The front operation controller 70 (see FIG. 5) is configured to receive operation signals to the various buttons of the front air-conditioning operation panel 50. The front operation controller 70 may be a computer mounted in the front air-conditioning operation panel 50, for example. For example, the front operation controller 70 is configured to store the operation signals input from the various buttons of the front air-conditioning operation panel 50, and transmit the operation signals to the air conditioning ECU 100.

Figure 4:
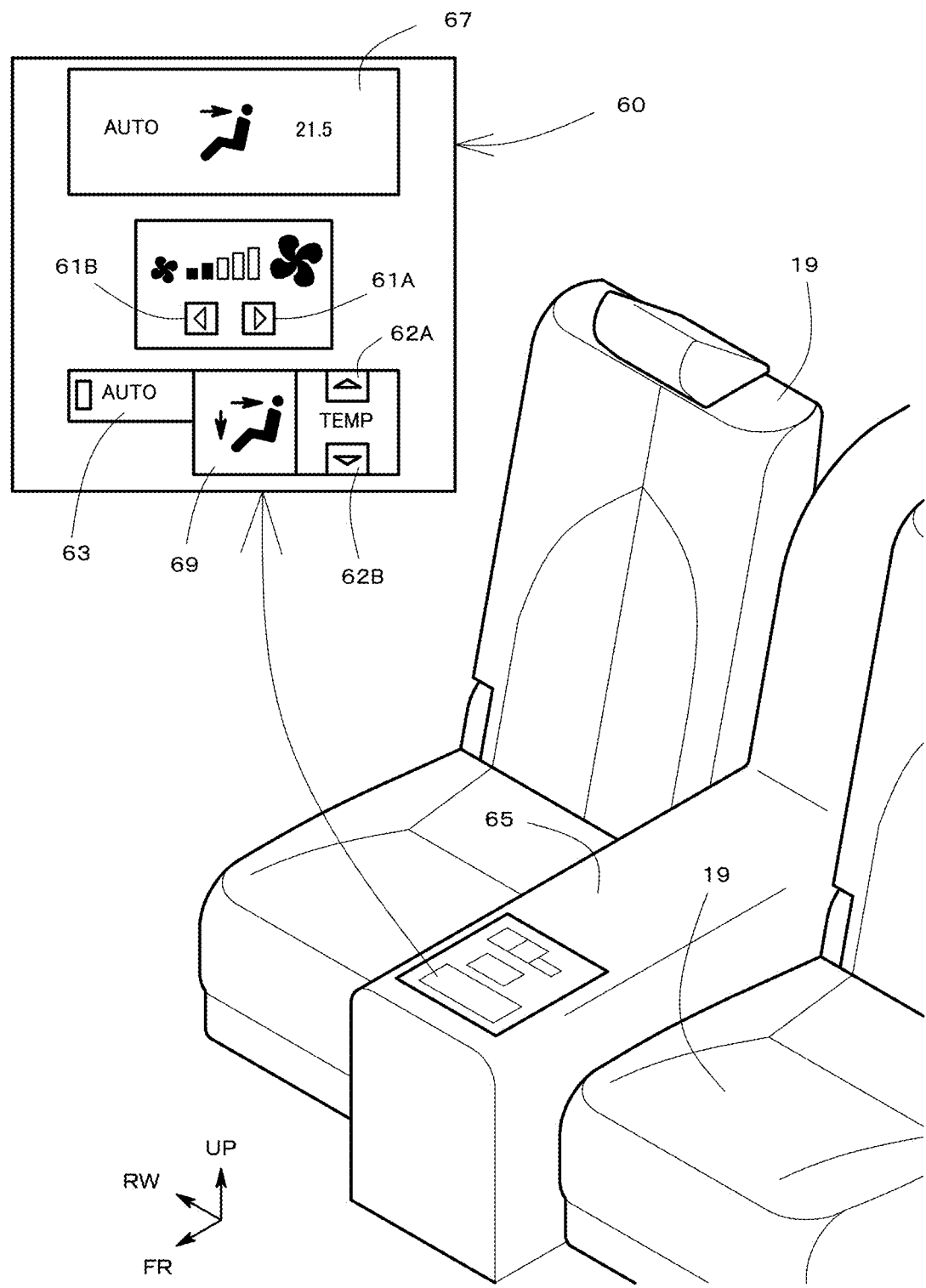
FIG. 4 is a diagram illustrating the configuration of a rear portion of the vehicle cabin.

FIG. 4 illustrates the rear air-conditioning operation panel 60 which is a part of the air conditioning system for a vehicle according to this embodiment. For example, the rear air-conditioning operation panel 60 is provided in a rear console 65. For example, the rear console 65 is provided between a pair of rear seats 19 and 19. This rear air-conditioning operation panel 60 and the rear operation controller 71 (see FIG. 5) constitute a rear air-conditioning controller 121.

The rear air-conditioning operation panel 60 may be a touch panel that functions as both an inputter and a display, for example. Operation on the volume of air to the rear part of the vehicle cabin is possible through the rear air-conditioning operation panel 60. For example, the rear air-conditioning operation panel 60 is provided with: air-volume setting buttons 61A and 61B; temperature setting buttons 62A and 62B; an automatic button 63; and a blowout port selection switch 69. Since the functions of these buttons and switches are already known, their description will be omitted, as appropriate.

Figure 6:
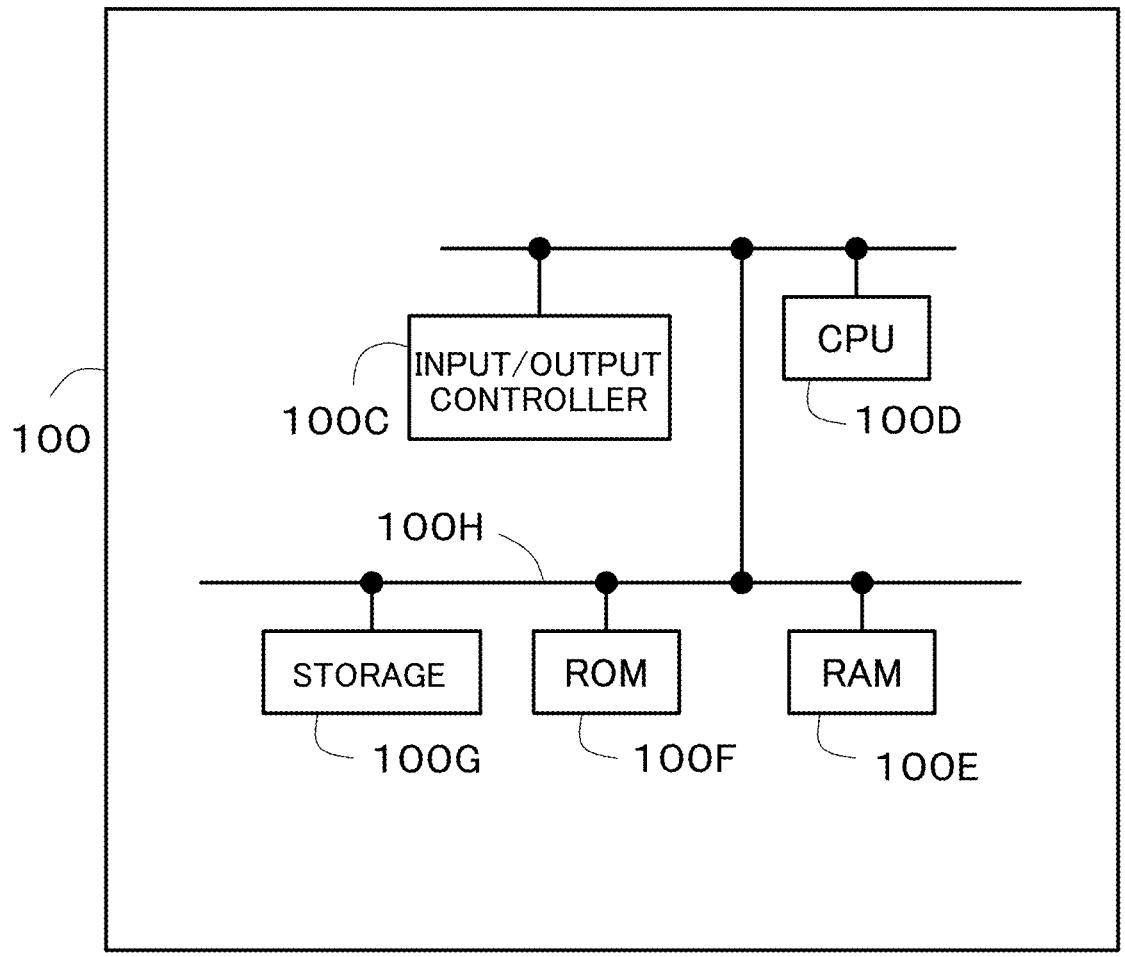
FIG. 6 is a diagram illustrating the hardware configuration of an air conditioning ECU.

The rear operation controller 71 (see FIG. 5) is configured to receive operation signals to the various buttons of the rear air-conditioning operation panel 60. The rear operation controller 71 may be a computer mounted in the rear air-conditioning operation panel 60, for example. This computer has a hardware configuration as illustrated in FIG. 6.

For example, the rear operation controller 71 is configured to store the operation signals input from the various buttons of the rear air-conditioning operation panel 60, and transmit the operation signals to the air conditioning ECU 100.

In addition, as will be described later, the rear operation controller 71 can execute limitation on the volume of air, that is, limit the volume of warm air to the rear side of the vehicle cabin (i.e., rear air conditioning). For example, referring to FIG. 4, the volume of air can be set in a range of zero to five through the air-volume setting buttons 61A and 61B when no limitation on the volume of air is executed, while the maximum volume of air is limited to three when the limitation on the volume of air is being executed. In other words, even when an occupant tries to increase the volume of air to more than three through the air-volume setting button 61A, the rear operation controller 71 deactivates this operation. This limitation on the volume of air will be described in detail later.

<Air Conditioning ECU>

The air conditioning ECU 100 is an electric controller that is configured to control the air conditioning system for a vehicle. For example, the air conditioning ECU 100 is constituted of a computer and has a hardware configuration as illustrated in FIG. 6. Specifically, the air conditioning ECU includes: an input/output controller 100C; a CPU 100D; a RAM 100E; a ROM 100F; and a storage device 100G. These electronic devices are connected to each other via an internal bus 100H.

Referring to FIG. 5, in order to control the electric heater 30, the air conditioning ECU 100 is connected to the switch panel 35, the pump inverter 45, and a refrigerant temperature sensor 92. In addition, in order to control the front blower 80A and the rear blower 80B, the air conditioning ECU 100 is connected to a front room temperature sensor 90A, a rear room temperature sensor 90B, the front inverter 84A, and the rear inverter 84B.

In addition, as a connection destination for air conditioning operation, the air conditioning ECU 100 is connected to the front air-conditioning operation panel 50 via the front operation controller 70, and the air conditioning ECU 100 is also connected to the rear air-conditioning operation panel 60 via the rear operation controller 71.

Further, in order to control the volume of air outside the vehicle to be introduced into the engine compartment 12, the air conditioning ECU 100 is connected to the controllers 22A and 22B of the grille shutter upper 20A and the grille shutter lower 20B, and the air conditioning ECU 100 is also connected to rotation speed sensors 26A and 26B that are sensors for judging whether or not the fins 25A and 25B are turnable.

The rotation speed sensors 26A and 26B include Hall elements, for example. The rotation speed sensors 26A and 26B output pulse signals according to a relative distance between magnets (not illustrated) provided in rotors of the actuators 24A and 24B.

In addition, the air conditioning ECU 100 is connected to a vehicle speed sensor 96 and an outside-vehicle temperature sensor 94 in order to acquire values (a vehicle speed and a temperature outside the vehicle) to be referenced for judging whether or not the limitation on the volume of air of the rear air conditioning to be described later can be executed.

The CPU 100D executes a control program stored in the ROM 100F (see FIG. 6) or the storage device 100G of the air conditioning ECU 100, to implement the functional blocks illustrated in FIG. 5 in the air conditioning ECU 100. These functional blocks can also be implemented such a way that the CPU 100D reads and executes a control program stored in a non-transient computer-readable storage medium such as a DVD.

The air conditioning ECU includes: a shutter evaluator 101; an outside-vehicle temperature evaluator 102; a vehicle speed evaluator 103; a previous value storage 104; an air conditioning control evaluator 105; and the device controller 106. These functional blocks execute a flow of judging the limitation on the volume of air of the rear air conditioning to be described below.

<Flow of Judging Limitation on Volume of Air of Rear Air Conditioning>

Figure 9:
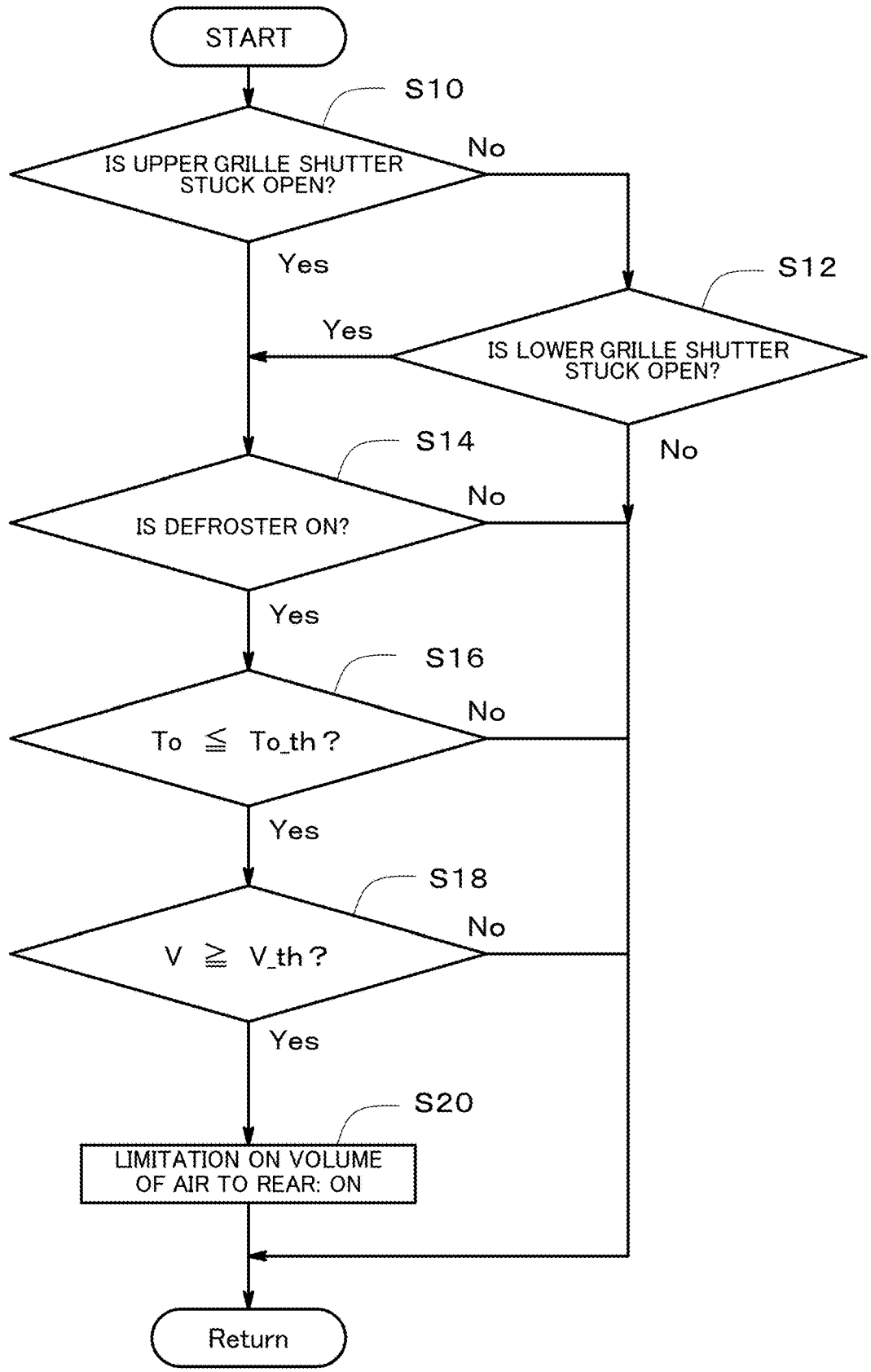
FIG. 9 is a diagram illustrating a flow of judging limitation on the volume of air to the rear which is executed by the air conditioning system for a vehicle according to this embodiment.

FIG. 9 illustrates the flow of judging the limitation on the volume of air of the rear air conditioning executed by the air conditioning system for a vehicle according to this embodiment. In this flow, when the temperature of warm air for a defroster is expected to be hard to increase when the grille shutter is stuck open, the limitation on the volume of air to the rear side of the vehicle cabin (i.e., rear air conditioning) is executed. Note that this flow iterates as indicated by "Return" at the end.

Referring to FIGS. 5 and 9, the shutter evaluator 101 judges whether or not the grille shutter upper 20A gets stuck open (S10). For example, the shutter evaluator 101 judges whether or not the fin 25A is in an open state based on an activity log of the fin 25A acquired from the rotation speed sensor 26A.

In addition, when the fin 25A is in an open state, the shutter evaluator 101 transmits a drive command (close command) for verification to the controller 22A. The controller 22A having received the drive command drives the actuator 24A to turn the fin 25A and put it in a closed state.

The rotation speed sensor 26A detects whether or not the fin 25A has been turned. The shutter evaluator 101 judges that the grille shutter upper 20A is stuck open when no pulse signal is output from the rotation speed sensor 26A within a predetermined period of time after the shutter evaluator transmits the drive signal to the controller 22A.

When it is judged that the grille shutter upper 20A is not stuck open, the shutter evaluator 101 next judges whether or not the grille shutter lower 20B gets stuck open (S12). In this stuck-open judgment, the same processing as that in the above judgment on whether the grille shutter upper 20A is stuck open is executed.

When it is judged that either the grille shutter upper 20A or the grille shutter lower 20B is stuck open, the air conditioning control evaluator 105 judges whether or not the defroster function is in an on state based on an operation signal log stored in the front operation controller 70 (S14). For example, the air conditioning control evaluator 105 checks whether or not the defroster button 58A (see FIG. 3) is kept on based on an operation log of the front operation controller 70.

Assume that a condition where either the grille shutter upper 20A or the grille shutter lower 20B is stuck open (stuck in an open state) and the defroster function is in an on state is set as the first condition. When this first condition is satisfied, the rear operation controller 71 can execute limitation on the volume of air to the rear side of the vehicle cabin.

In the flowchart of FIG. 9, judgment steps of a second condition on the temperature outside the vehicle (S16) and a third condition on the vehicle speed (S18) are provided in addition to that of the first condition. The outside-vehicle temperature evaluator 102 judges whether or not an outside-vehicle temperature To, that is acquired from the outside-vehicle temperature sensor 94, is equal to or lower than a predetermined threshold temperature To_th (S16).

Figure 7:
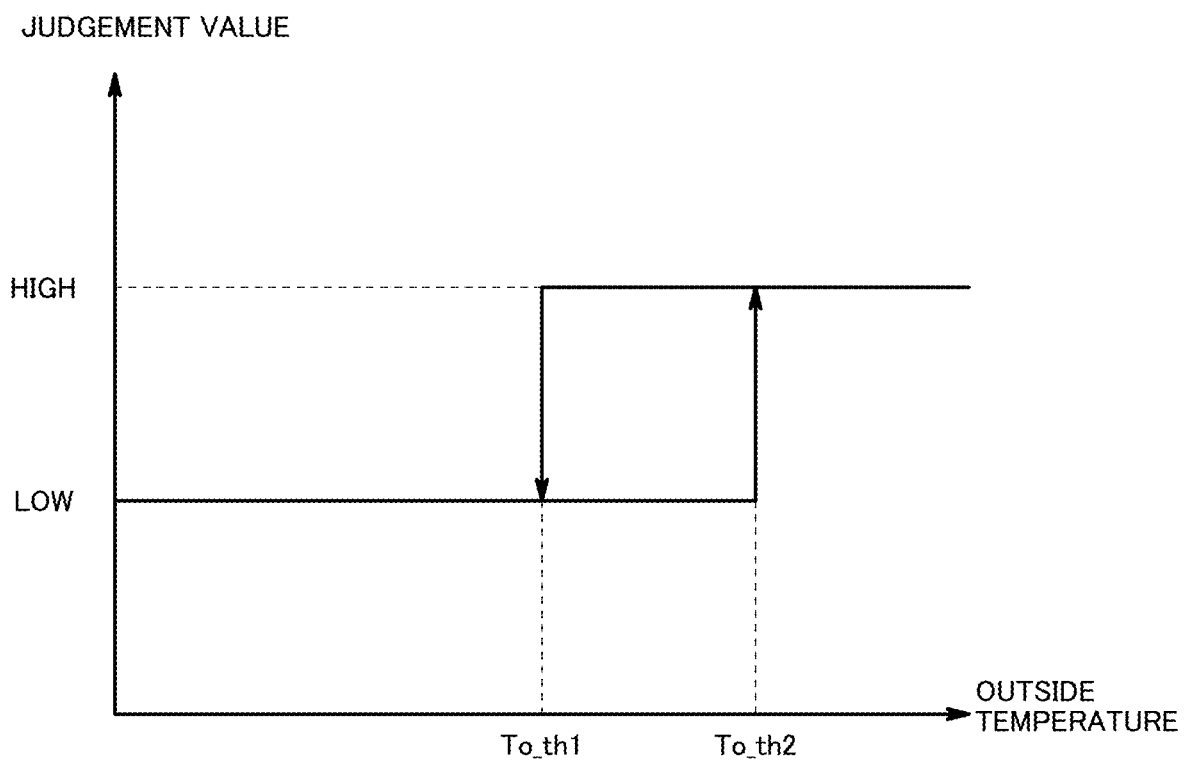
FIG. 7 is a diagram illustrating the setting of a threshold temperature To_th for a temperature outside the vehicle.

Here, the threshold temperature To_th may be set in consideration of what is called hysteresis. FIG. 7 indicates two threshold temperatures To_th1 and To_th2. The outside-vehicle temperature evaluator 102 judges, while referring to the previous value storage 104, whether or not the outside-vehicle temperature To, acquired when the previous flow was executed, exceeds the threshold temperature To_th2. When the previous outside-vehicle temperature To exceeds the threshold temperature To_th2, the threshold temperature To_th1 is set as the threshold temperature this time in Step S16. When the previous outside-vehicle temperature To is equal to or lower than the threshold temperature To_th2, the threshold temperature To_th2 is set as the threshold temperature this time in Step S16.

In Step S16, when the outside-vehicle temperature To exceeds the threshold temperature To_th (To_th1 or To_th2), that is, when the air outside the vehicle is relatively warm, no limitation on the volume of air to the rear is executed.

Assuming that a condition where the outside-vehicle temperature To is equal to or lower than the threshold temperature To_th is set as the second condition, when the first condition (the grille shutter is stuck open & the defroster is on) is satisfied and the second condition is satisfied, the rear operation controller 71 can execute limitation on the volume of air to the rear side of the vehicle cabin. Note that in the flowchart of FIG. 9 the judgment step of the third condition on the vehicle speed (S18) is provided in addition to the first and second conditions.

Figure 8:
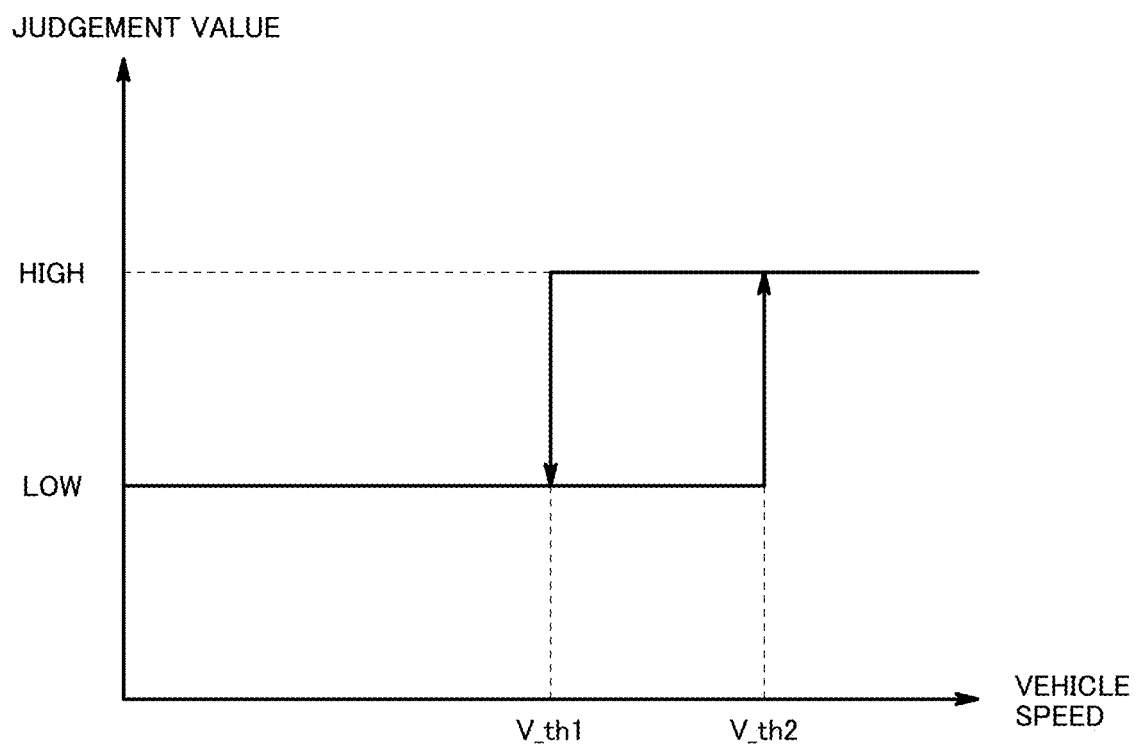
FIG. 8 is a diagram illustrating the setting of a threshold speed V_th for a vehicle speed.

The vehicle speed evaluator 103 judges whether or not a vehicle speed V acquired from the vehicle speed sensor 96 is equal to or higher than a predetermined threshold speed V_th (S18). Here, the threshold speed V_th may be set in consideration of hysteresis, as in Step S16. FIG. 8 indicates two threshold speeds V_th1 and V_th2. The vehicle speed evaluator 103 judges, while referring to the previous value storage 104, whether or not the vehicle speed V acquired when the previous flow was executed is equal to or higher than the threshold speed V_th2. When the previous vehicle speed V is equal to or higher than the threshold speed V_th2, the threshold speed V_th1 is set as the threshold speed this time in Step S18. When the previous vehicle speed V is lower than the threshold speed V_th2, the threshold speed V_th2 is set as the threshold speed this time in Step S18.

In Step S18, when the vehicle speed V is lower than the threshold speed V_th (V_th1 or V_th2), no limitation on the volume of air to the rear is executed. Assuming that a condition where the vehicle speed V is equal to or higher than the threshold speed V_th is set as the third condition, when the first condition (the grille shutter is stuck open & the defroster is on) and the second condition (the outside-vehicle temperature To≤To_th) are satisfied, and the third condition is satisfied, the rear operation controller 71 executes limitation on the volume of air to the rear side of the vehicle cabin.

For example, referring to FIG. 4, when the limitation on the volume of air is being executed, the rear operation controller 71 limits the maximum volume of air to three. Even when an occupant tries to increase the volume of air to more than three through the air-volume setting button 61A, the rear operation controller 71 deactivates this operation (keeps the volume of air at three). The rear operation controller 71 does not transmit the operation signal at this time to the air conditioning ECU 100. In addition, the rear operation controller 71 displays, on a display 67 (see FIG. 4), a message to the effect that the maximum volume of air under limitation on the volume of air is three.

Note that in the flowchart of FIG. 9 the limitation on the volume of air to the rear side of the vehicle cabin is executed when all of the first condition (the grille shutter is stuck open & the defroster is on), the second condition (the outside-vehicle temperature To≤To_th), and the third condition (the vehicle speed V≥V_th) are satisfied. However, the air conditioning system for a vehicle according to this embodiment is not limited to this embodiment.

For example, the rear operation controller 71 may execute limitation on the volume of air once the first condition is satisfied. Alternatively, the rear operation controller 71 may execute limitation on the volume of air once the first condition and the second condition are satisfied. In any case, in the air conditioning system for a vehicle according to this embodiment, it is judged whether or not the various conditions are satisfied from a perspective of securing the heating function of the electric heater 30.

Here, assuming that a flow of acquiring a refrigerant temperature from the refrigerant temperature sensor 92 (see FIG. 5) and judging whether or not the limitation on the volume of air can be executed based on comparison between the refrigerant temperature and a threshold temperature is provided, it may take time for the refrigerant temperature to come back to a sufficient temperature after it decreases, and therefore the defogging function may be deteriorated during that period.

In contrast, in the flowchart of FIG. 9, it is judged whether or not the limitation on the volume of air can be executed without providing the step using the refrigerant temperature, and based only on the factors of suppressing an increase in temperature of the electric heater 30. Such judgment enables the electric heater 30 to heat refrigerant liquid constantly and reliably.

The present disclosure is not limited to the present embodiments described above, and includes all changes and modifications without departing from the technical scope or the essence of the present disclosure defined by the claims.

The invention claimed is:

1. An air conditioning system for a vehicle comprising:
a grille shutter provided on a front part of a vehicle and arranged in a front face of an engine compartment where a driving source is installed, the grille shutter being capable of adjusting a volume of outside air to be introduced into the engine compartment;
a heat source installed in the engine compartment;
circulation piping through which refrigerant liquid flows, the circulation piping including a temperature increase section which goes through the heat source, wherein the circulation piping diverges into a vehicle cabin front section and a vehicle cabin rear section from the temperature increase section and converges to return to the temperature increase section;
a front blower configured to send warm air to a front part of a vehicle cabin by exchanging heat with refrigerant liquid flowing through the vehicle cabin front section;
a rear blower configured to send warm air to a rear part of the vehicle cabin by exchanging heat with refrigerant liquid flowing through the vehicle cabin rear section;
a front air-conditioning controller configured to control a volume of air directed to the front part of the vehicle cabin, including ON/OFF of a defroster function; and
a rear air-conditioning controller configured to control the volume of air directed to the rear part of the vehicle cabin, wherein
the rear air-conditioning controller is operable to limit the volume of air directed to the rear part of the vehicle cabin when a first condition is satisfied, wherein the first condition is a condition where the grille shutter is stuck in an open state and the defroster function is in an ON state.

2. The air conditioning system for a vehicle according to claim 1, wherein the rear air-conditioning controller is operable to limit the volume of air directed to the rear part of the vehicle cabin when the first condition and a second condition are satisfied, wherein the second condition is a condition where a temperature outside the vehicle is equal to or lower than a threshold temperature.

3. The air conditioning system for a vehicle according to claim 2, wherein the rear air-conditioning controller is configured to limit the volume of air directed to the rear part of the vehicle cabin when the first condition and the second condition are satisfied, and a third condition is satisfied, wherein the third condition is a condition where a vehicle speed is equal to or higher than a threshold speed.

* * * * *